United States Patent
Herrick

(10) Patent No.: US 8,989,298 B2
(45) Date of Patent: Mar. 24, 2015

(54) DATA ENCODING BASED ON NOTCH FILTERING TO PREVENT DESENSE

(75) Inventor: Christopher J. Herrick, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 1007 days.

(21) Appl. No.: 13/072,195

(22) Filed: Mar. 25, 2011

(65) Prior Publication Data

US 2012/0243633 A1    Sep. 27, 2012

(51) Int. Cl.
  *H04B 15/00* (2006.01)
  *H04L 25/03* (2006.01)
  *H04B 1/10* (2006.01)

(52) U.S. Cl.
  CPC ........ *H04L 25/03834* (2013.01); *H04B 1/1036* (2013.01); *H04L 25/03866* (2013.01)
  USPC ............................. 375/285; 375/296; 375/359

(58) Field of Classification Search
  CPC ...... H04B 1/7097; H04B 1/10; H04B 1/1036; H04B 1/7101
  See application file for complete search history.

(56) References Cited

U.S. PATENT DOCUMENTS

| 6,108,367 A | 8/2000 | Herman et al. |
| 7,492,807 B1 | 2/2009 | Buchmann et al. |
| 2005/0186986 A1 | 8/2005 | Hansen et al. |
| 2009/0088092 A1* | 4/2009 | Wang et al. ................. 455/114.2 |
| 2011/0286535 A1* | 11/2011 | Ko et al. ........................ 375/259 |

* cited by examiner

*Primary Examiner* — Curtis Odom
(74) *Attorney, Agent, or Firm* — Lawrence J. Merkel; Meyertons, Hood, Kivlin, Kowert & Goetzel, P.C.

(57) ABSTRACT

In one embodiment, a data encoder for a component (such as an integrated circuit) may encode data to be transmitted from the component to another component in a system. The encoder may avoid one or more data patterns that, if transmitted by the component, may cause noise to occur at one or more specified frequencies (or frequency bands). The specified frequencies may be frequencies that are in use for wireless communication by the device. By avoiding noise at the specified frequencies, the desense that might otherwise occur may be reduced or eliminated. Quality and speed of the wireless communication may be increased.

10 Claims, 5 Drawing Sheets

DATA ENCODING BASED ON NOTCH FILTERING TO PREVENT DESENSE

BACKGROUND

1. Field of the Invention

This invention is related to the field of wireless devices and, more particularly, to desense problems in wireless devices.

2. Description of the Related Art

Many electronic devices include wireless communications capabilities. Wireless communication is critical for many portable devices such as cell phones, personal digital assistants, global position system (GPS) devices, laptops, and smart phones. Other, less portable devices often include wireless communication as well (e.g. desktop computers and other relatively fixed-location devices).

Wireless communication involves receiving/transmitting a radio-frequency signal or signals on an antenna, and processing the signals to determine the information transmitted. Some devices may include the capability to communicate concurrently over multiple wireless communications protocols (e.g. concurrent communication on wireless fidelity (WiFi); cell phone protocols such as global system for mobile communications (GSM), code division multiple access (CDMA), time division multiple access (TDMA) etc.; Bluetooth; and/or GPS). An issue that such devices can experience is "desense." Desense refers to system noise that reduces the sensitivity of the antennas for receiving wireless signals. More specifically, desense is a result of a reduction in the signal to noise ratio at the frequency band of interest (i.e. the frequency band, or bands, in use for wireless communication). When desense occurs, the performance of the wireless communication may decrease. In more extreme cases, the wireless communication can cease to operate.

All electronic devices need to meet certain electromagnetic interference (EMI) specifications. Some devices implement data scrambling to modify data streams transmitted between components in the device to make the modified data streams appear to be pseudo random. For example, devices that generate repetitive data patterns in their data streams (such as display data for a display on the device or connected to the device) may implement scrambling of the repetitive data. The scrambling reduces the amplitude of the noise at any given frequency but spreads the noise over a wider band of frequencies. The reduced noise amplitudes help meet the EMI requirements. However, such techniques increase the desense problem by ensuring that any frequency that might be used for wireless communication will likely experience at least some noise.

SUMMARY

In one embodiment, a data encoder for a component (such as an integrated circuit) may encode data to be transmitted from the component to another component in a system. The encoder may avoid one or more data patterns that, if transmitted by the component, may cause noise to occur at one or more specified frequencies (or frequency bands). The specified frequencies may be frequencies that are in use for wireless communication by the device. By avoiding noise at the specified frequencies, the desense that might otherwise occur may be reduced or eliminated. Quality and speed of the wireless communication may be increased.

In one embodiment, to reduce desense, the power spectral density of the encoded data may be reduced (e.g. notched) at the frequencies of wireless operation. The desired power spectral density may be processed through an inverse Fourier transform to identify the data patterns to be avoided. In one implementation, the data patterns may be avoided by the data encoder monitoring the encoded data to detect the data patterns and modifying the detected patterns into replacement patterns. In another implementation, the encoding may be performed using a predefined alphabet of symbols, and any combination of the symbols may not result in the avoided data patterns.

BRIEF DESCRIPTION OF THE DRAWINGS

The following detailed description makes reference to the accompanying drawings, which are now briefly described.

Figure 1:
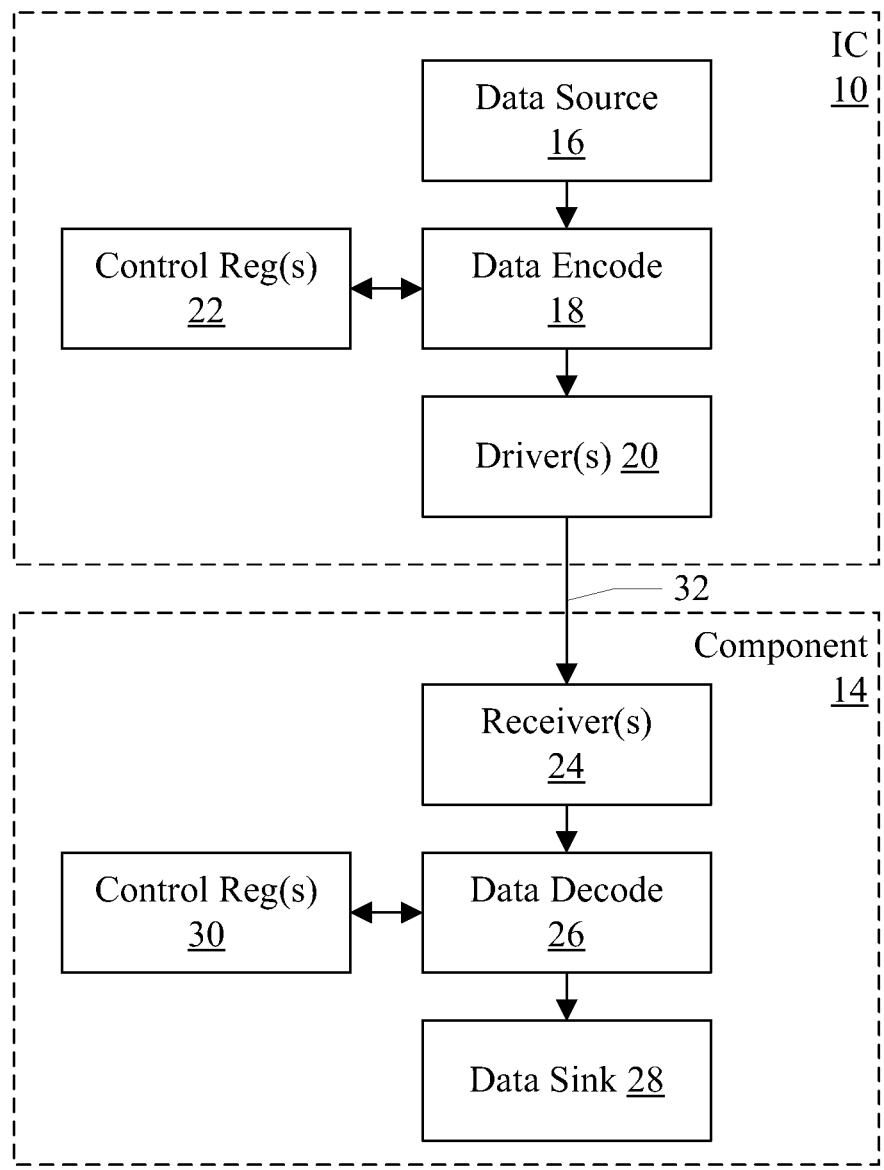
FIG. 1 is a block diagram of one embodiment of an integrated circuit and another component.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six interpretation for that unit/circuit/component.

DETAILED DESCRIPTION OF EMBODIMENTS

Turning now to FIG. 1, a block diagram of one embodiment of an integrated circuit 10 and another component 14 is shown. The integrated circuit 10 may include a data source 16, a data encode circuit 18, a driver circuit 20, and one or more control registers 22. The component 14 may include a receiver circuit 24, a data decode circuit 26, a data sink 28, and one or more control registers 30. In the illustrated embodiment, the data source 16 is coupled to the data encode circuit 18, which is further coupled to the control registers 22 and the driver circuit 20. The driver circuit 20 is coupled to one or more pins on the integrated circuit 10, which may be coupled to a circuit board (not shown in FIG. 1) to the component 14. The receiver circuit 24 is coupled to the pins or other connectors of the component 14 to receive the signals from the driver circuit 20 over the board connection. The receiver circuit 24 is coupled to the data decode circuit 26, which is further coupled to the data sink 28 and the control registers 30.

The data encode circuit 18 may be coupled to receive data to be transmitted external to the IC 10 (e.g. the data may be received from the data source 16). The data encode circuit 18 may be configured to encode the data. The data encode circuit 18 may be configured to encode the data using a code that avoids a set of data patterns identified to the data encode circuit 18. The data patterns may be determined by, for example, taking the frequency response associated with the encoded data transmissions (e.g. the power spectral density) and notching the power spectral density to remove or reduce the power at certain frequencies. The frequencies may be the frequencies at which wireless communication is to occur. The modified power spectral density may then be processed through an inverse Fourier transform to identify data patterns that would produce the notched frequencies, and these identified data patterns may be the data patterns to be avoided in the data encoder circuit 18.

In one embodiment, the data patterns to avoid may be programmed into the registers 22. The data encoder circuit 18 may be configured to initially encode the data transmitted by the data source 16, and to compare the initial encoded data to the patterns in the registers 22. If the pattern is detected, the data encoder circuit 18 may be configured to replace the detected pattern with a different pattern. The replacement pattern may differ from the detected pattern enough to avoid or reduce the noise generated at the wireless communication frequencies. The replacement pattern may be generated by modifying one or more bits of the detected pattern, or by replacing the detected pattern with the replacement pattern, in various embodiments. The replacement data pattern (or the modifications to make to the detected data patterns to from the replacement data pattern) may be programmed into the registers 22 as well.

It is possible that the initial encoded data stream also includes the replacement data pattern (that is, the replacement data pattern may itself be part of the data stream). In some embodiments, the data encode circuit 18 may be configured to include an indication in the encoded data stream when the replacement data pattern appears. The indication may identify the replacement data pattern as either actually included in the data stream or included as a replacement to the detected data pattern.

In such an embodiment, the control registers 30 may also be programmed with the replacement data patterns and the data patterns to be avoided. If the data decode circuit 26 detects a replacement data pattern (and the corresponding indication indicates that the replacement data pattern is a replacement for the avoided data pattern), the data decode circuit 26 may be configured to replace the replacement pattern with the avoided data pattern, thus recovering the original encoded data stream. The data decode circuit 26 may be configured to decode the original encoded data stream to recover the data stream for the data sink 28.

In another embodiment, the data encode circuit 18 and the data decode circuit 26 may implement a predefined alphabet of symbols to encode the data. The alphabet may be defined such that each possible combination of symbols transmitted by the data encode circuit 18 may avoid the data patterns identified in the reverse Fourier transform as discussed above. Each symbol may comprise a larger number of bits than the corresponding data word, in order to provide enough flexibility in the alphabet to avoid the data patterns. For example, 4 bit data words may be defined in the original data from the data source 16, and 5 or 6 bit symbols may be used. Any word size and corresponding symbol size may be used in other embodiments.

Generally, a symbol may be a multi-bit value that represents another multi-bit value in the original data. The symbols may be defined to provide a pseudo-random data transfer external to the IC 10 while also avoiding the identified data patterns in the transmitted data stream. Accordingly, each input data word may map to a symbol for transmission, and each received symbol may map to an output data word. An alphabet may be a set of symbols and its corresponding data value mappings.

In an embodiment, the data encode circuit 18 and the data decode circuit 26 may implement multiple alphabets, depending on the wireless communication frequency or frequencies that may be in use. One of the multiple alphabets may be selected as the active alphabet based on the wireless communication frequency or frequencies that are in use. The control registers 22 and 30 may be programmed, for example, to select the desired alphabets.

It is noted that, in one embodiment, the encoded data streams may be baseband transmissions between components such as the integrated circuit 10 and the component 14.

The data source 16 may include any circuitry that is configured to provide data for transmission. For example, the communication path 32 between the IC 10 and the component 14 may be a peripheral interface such as peripheral component interconnect (PCI), PCI express (PCIe), universal serial bus (USB), etc. In such an implementation, the data source 16 may be an interface controller for the peripheral interface. The interface controller may be coupled to various internal circuitry of the IC 10 which may make requests for the peripheral interface (e.g. read and write requests). The component 14 may be a storage device (e.g. various forms of volatile and/or non-volatile memory, a disk drive, etc.) and the data source 16 may be a storage controller. The data source 16 may also be any internal source of data (e.g. a processor executing instructions, a fixed function circuit, etc.). Similarly, the data sink 28 may be any circuitry configured to receive data (e.g. a storage device, an interface controller, a processor, fixed function circuitry, etc.). While FIG. 1 illustrates a data source in the IC 10 and a data sink in the component 14, various embodiments may include any number of sources and sinks. The IC 10 may include one or more data sinks and the component 14 may include one or more data sources.

The driver circuit 20 may include one or more drivers for the communication path 32 (e.g. one driver per signal line on the path 32). Generally, the driver circuit 20 may provide the current (and potentially higher voltage) to drive the signals on the board and to provide the desired electrical characteristics on the board (e.g. impedance, termination, etc.). The driver circuit 20 may be connected to the pins of the integrated circuit 10 to communicate external to the integrated circuit 10. The pins may be, e.g., package pins, solder balls, C4 bumps for chip-on-chip packaging, other electrical connectors, etc. The receiver circuit 24 may include one or more receivers to receive the signals from pins or other electrical connectors that couple the component 14 to the board (and thus to the integrated circuit 10). For example, the receiver circuit 24 may include one receiver per signal. The receiver may buffer internal circuitry in the component 14 from the voltages/currents/noise external to the component 14 and may convert signal levels to a lower internal voltage and/or sharper digital transitions in some embodiments.

Generally, a component such as component 14 may be any electrical circuitry that may be connected to a circuit board to become part of a device. Examples of components may include integrated circuits such as integrated circuit 10, programmable logic (e.g. field programmable gate arrays (FPGAs) and/or other programmable logic devices (PLDs), other circuit boards (e.g. a memory module or other board that connects to the circuit board via a connector), other devices (e.g. storage devices), discrete components (such as resistors, capacitors, transistors, etc.), power supplies, antennas, interface devices such as speakers and/or video display devices, etc. While two components (IC 10 and component 14) are shown, various embodiments may implement any number of components and interconnection therebetween.

Figure 2:
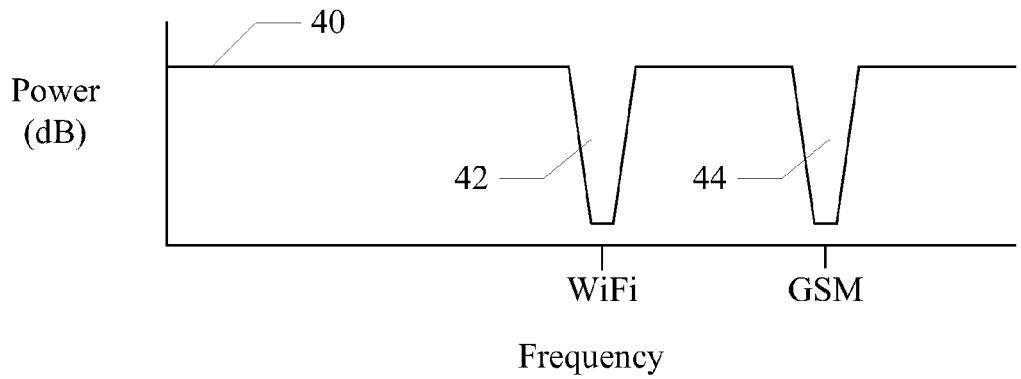
FIG. 2 is a diagram illustrating one embodiment of a power spectral density, including notch filtering at desired frequencies.

FIG. 2 is a diagram illustrating a power spectral density for the transmission of data on the path 32. Specifically, FIG. 2 illustrates the power of the data stream transmitted over the path 32, measured in decibels (dB) as a function of the frequency. FIG. 2 is a somewhat simplified depiction of the density, illustrating an even, constant power across the frequency spectrum as represented by the horizontal line 40. As mentioned previously, various data scrambling algorithms attempt to approximate the constant power density, but may vary somewhat from the constant density.

Also illustrated in FIG. 2 are notches 42 and 44 at frequencies that may be in use for wireless communication. That is, the power at or near the frequencies of interest may be substantially reduced, or possibly even eliminated. In the example of FIG. 2, the notch 42 is made at the frequency being used for WiFi and the notch 44 is made at the frequency being used for GSM. Any set of one or more notches may be formed based on the wireless communications frequencies. Additionally, a notch may be made over a frequency band if the wireless communication occurs over multiple frequencies, or there may be multiple notches at desired frequencies for a given form of wireless communication (e.g. if the desired frequencies are widely separated).

Figure 3:
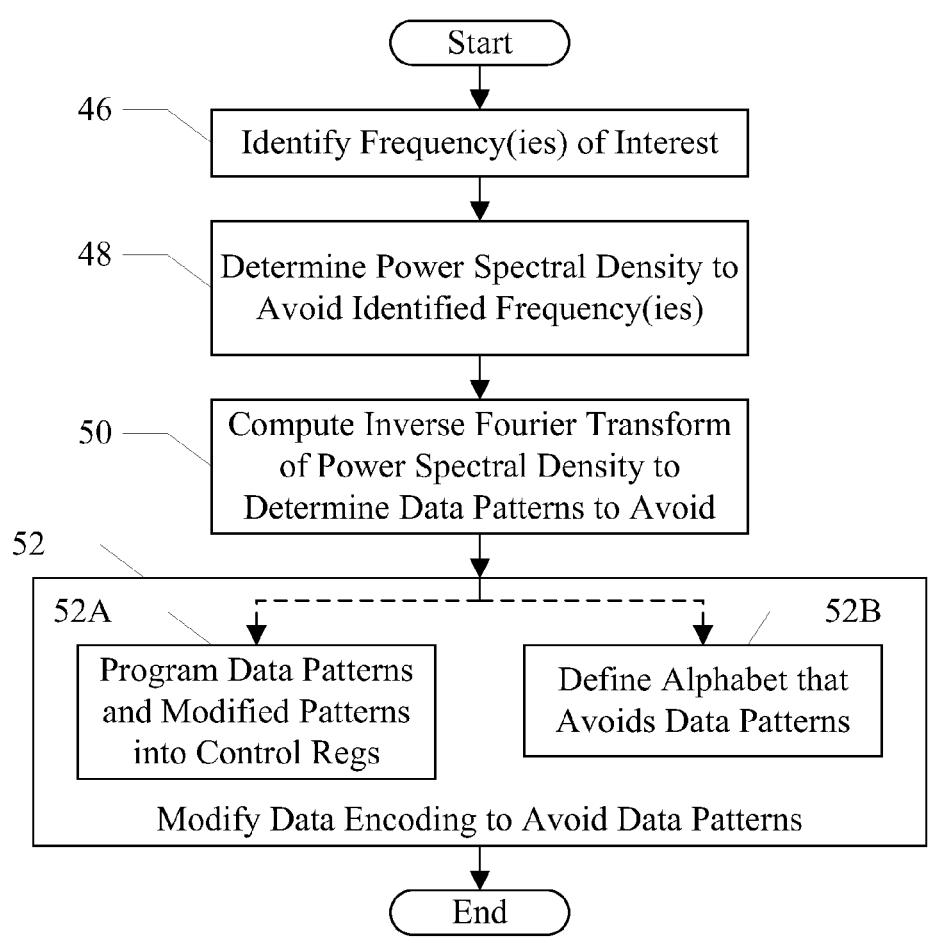
FIG. 3 is a flowchart illustrating one embodiment of determining data patterns to avoid to achieve the notch filtering illustrated in FIG. 2.

FIG. 3 is a flowchart illustrating the determination of data patterns to avoid in order to cause the notches (e.g. the notches 42 and 44 in FIG. 2) to occur in the power spectral density corresponding to the data transmitted, according to one embodiment. While the blocks are shown in a particular order for ease of understanding, other orders may be used. In one embodiment, the operation illustrated in FIG. 3 may be performed as an analysis prior to use, to design the data encode and decode circuits 18 and 26. Alternatively, the operation may be performed dynamically in the system (e.g. as the wireless communication frequencies change). A processor or processors in the system may execute instructions to implement the operation shown in FIG. 3, or a portion thereof. For example, a variety of fast Fourier transform (FFT) algorithms may be used.

The frequencies of interest (i.e., the wireless communication frequencies) may be identified (block 46). The frequencies may be specified in various wireless communication standards, and thus the frequencies may depend on the active wireless interfaces. The frequencies may be selectable from a specified range in a given wireless communication standard, and thus the frequencies of interest may be the selected frequencies (or the range of frequencies, in other embodiments).

The power spectral density that includes the notches at the frequencies of interest may be determined (block 48). The initial power spectral density may be the power spectral density of the scrambled data stream, and the density may be modified by reducing the power (or notching the density) at the frequencies of interest. The inverse Fourier transform of the modified power spectral density (determined in block 48) may be computed. The patterns to avoid may thus be determined (block 50). The encoding of data from the data source 16 to produce the encoded data may be modified to avoid the identified data patterns (block 52) There are a variety of ways that the encoding may be modified. For example, an embodiment may program the data patterns to be avoided and the modified (or replacement) data patterns to be used in place of the avoided data patterns may be programmed into the control registers 22 and 30 (block 52A). Alternatively, an encoding alphabet may be defined that ensures that any combination of symbols in the alphabet may be transmitted without causing the avoided data patterns to be transmitted (block 52B).

Figure 4:
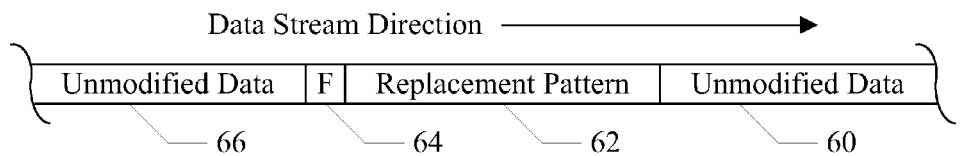
FIG. 4 is a block diagram illustrating one embodiment of encoding data to avoid desense interference.

FIG. 4 is a block diagram illustrating a data stream of encoded data in which a replacement pattern is used in place of a data pattern to be avoided in the stream. The data stream flows to the right in FIG. 4. That is, the unmodified data 60 is transmitted first, followed by the replacement pattern 62 and flag 64, followed by additional unmodified data 66.

As illustrated, unmodified data 60 may be transmitted because the data does not include the patterns to be avoided. The data may be unmodified in the sense that no replacement pattern is used. The unmodified data 60 may still have been scrambled from the source data to produce the data to be transmitted, thus creating the power spectral density illustrated in FIG. 2, for example.

Subsequent to the unmodified data, one of the identified data patterns that are to be avoided is detected. A corresponding replacement pattern 62 is transmitted instead. The replacement pattern 62 may differ in one or more bits from the identified (avoided) data pattern, changing the effect of the pattern on the power spectral density to reduce the power at the frequencies of interest.

The replacement pattern 62 may itself be transmitted in the data stream. That is, the scrambling of data from the data source 16 may result in generation of the replacement pattern (as opposed to detecting the identified pattern and inserting the replacement pattern instead). A flag 64 may be used to indicate whether the replacement pattern is being transmitted in place of the identified pattern or the replacement pattern is actually part of the data stream. For example, the flag 64 may be set to indicate that the pattern is a replacement for an identified pattern and clear to indicate that the replacement pattern is actually part of the data stream. Other embodiments may use the opposite meanings of the set and clear states of the flag, or other indications.

In the illustrated embodiment, the flag 64 is appended to the end of the replacement pattern (or post-pended), and thus is transmitted after the replacement pattern in the data stream. The placement of the flag 64 at the end may permit flexibility in the implementation. For example, the replacement data pattern may differ from the identified data pattern in bits that are near the end of the pattern (in terms of transmission order). Accordingly, arbitrarily large patterns may be supported and the pattern may begin transmission prior to detection of the identified pattern and replacement by the replacement pattern. The flag may thus be generated after then pattern has started transmission in such embodiments. Other embodiments may pre-pend the flag to the replacement pattern or use any other placement.

Subsequent to the replacement pattern 62 and flag 64, the additional unmodified data may be transmitted.

Figure 5:
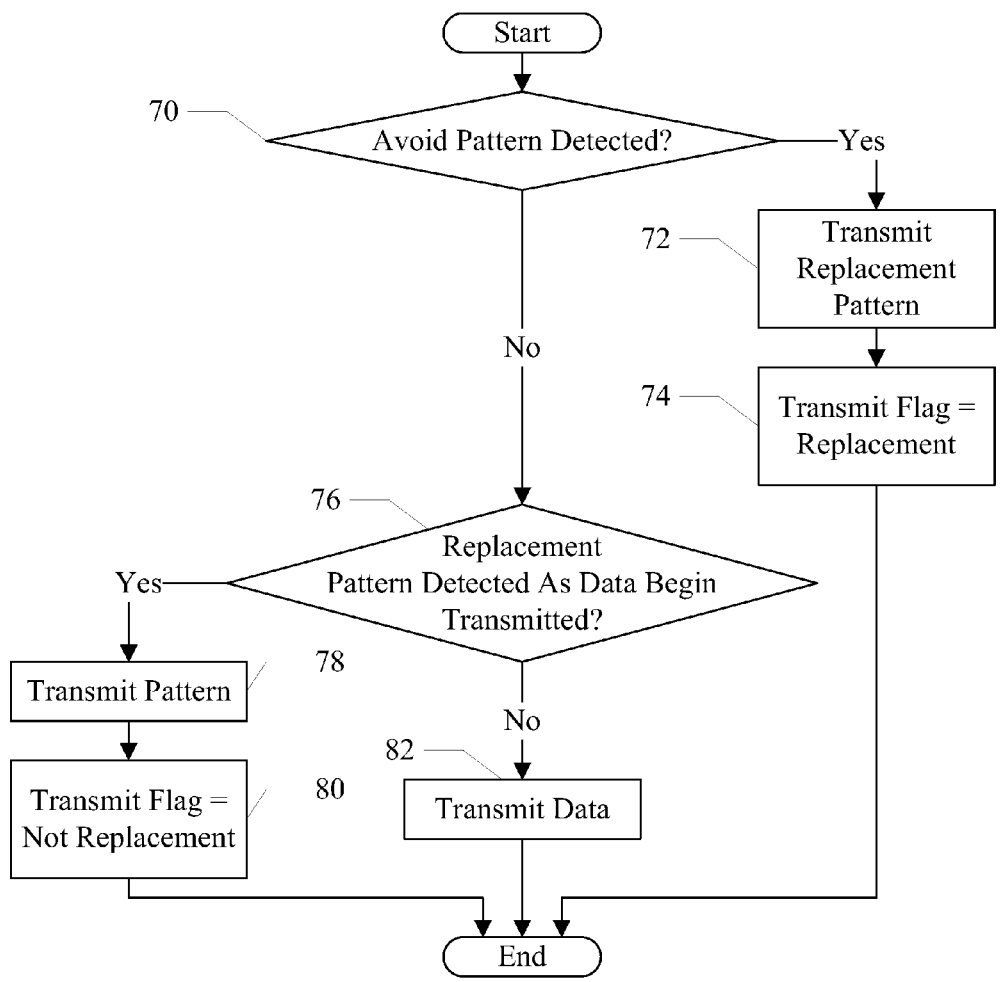
FIG. 5 is a flowchart illustrating operation of one embodiment of a transmitting component in a system.

Turning now to FIG. 5, a flowchart is shown illustrating operation of one embodiment of the data encode circuit 18. While the blocks are shown in a particular order in FIG. 5 for ease of understanding, other orders may be used. Blocks may be performed in parallel in combinatorial logic in the data encode circuit 18. Blocks, combinations of blocks, and/or the flowchart as a whole may be pipelined over multiple clock cycles.

The data encode circuit 18 may be configured to monitor the data that it has encoded from the data provided by the data source 16. For example, the data encode circuit 18 may be configured to encode data as it is provided by the data source 16, and may be configured to accumulate the data in a shift register. As data is shifted out of the shift register, the data may be transmitted. The data encode circuit 18 may be configured to compare the data in the shift register to the patterns to be avoided. If an avoided pattern is detected (decision block 70, "yes" leg), the data encode circuit 72 may be configured to transmit the replacement pattern instead (block 72). The replacement pattern may be inserted in place of the avoided pattern. Alternatively, the replacement pattern may be generated by modifying certain bits in the avoided pattern. Any mechanism for generating and using the replacement pattern may be employed. The data encode circuit 72 may also be configured to provide the flag in the state indicating replacement (e.g. set, in an embodiment) (block 74).

The data encode circuit 16 may also be configured to monitor the data for the replacement pattern itself. If the replacement pattern is detected (decision block 76, "yes" leg), the data encode circuit 16 may transmit the pattern followed by the flag indicating that the pattern is not a replacement (e.g. clear, in this case) (blocks 78 and 80, respectively). If neither the avoided data patterns nor the replacement data patterns are detected (decision blocks 70 and 76, "no" legs), the data encode circuit 16 may be configured to transmit the unmodified (encoded) data (block 82).

Figure 6:
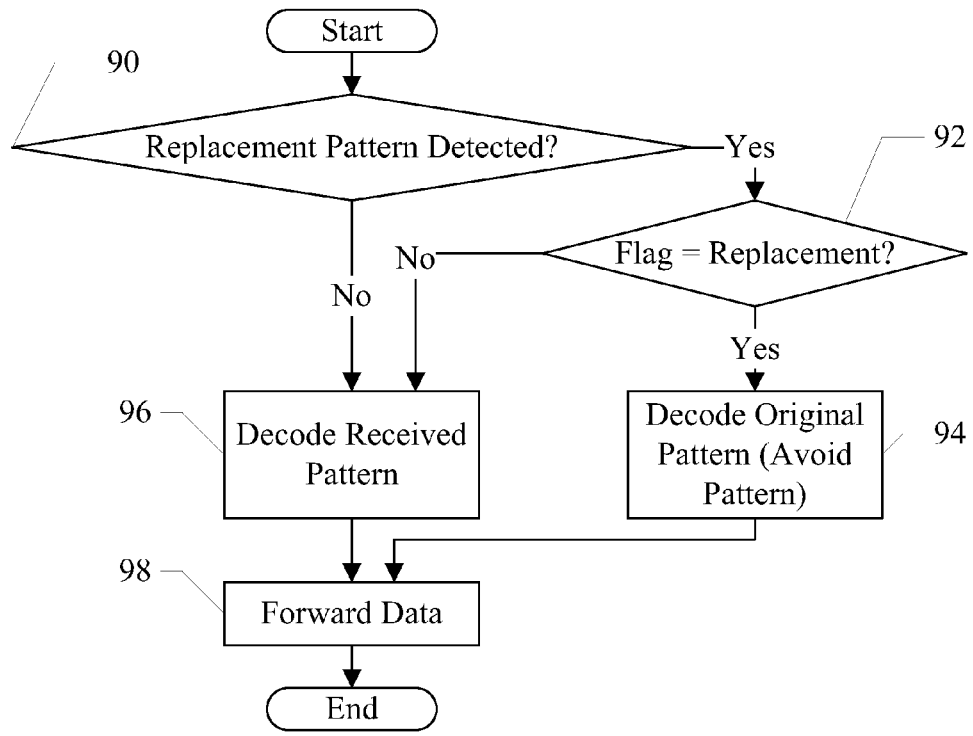
FIG. 6 is a flowchart illustrating operation of one embodiment of a receiving component in a system.

Turning now to FIG. 6, a flowchart is shown illustrating operation of one embodiment of the data decode circuit 26. While the blocks are shown in a particular order in FIG. 6 for ease of understanding, other orders may be used. Blocks may be performed in parallel in combinatorial logic in the data decode circuit 26. Blocks, combinations of blocks, and/or the flowchart as a whole may be pipelined over multiple clock cycles.

The data decode circuit 26 may be configured to monitor the received data for the replacement patterns. If a replacement pattern is detected (decision block 90, "yes" leg), the data decode circuit 26 may check the flag. If the flag indicates that the pattern is indeed a replacement pattern, e.g. a set state (decision block 92, "yes" leg), the data decode circuit 26 may be configured to decode the original pattern (that is, the avoided pattern) (block 94). Thus, the data decode circuit 28 may reverse the replacement of the original pattern with the replacement pattern. If the replacement pattern is not detected or the flag indicates that the replacement pattern is not a replacement for an original pattern (decision blocks 90 or 92, "no" legs), the data decode circuit 26 may be configured to decode the received pattern. (block 96). In either case (block 94 and 96), the data decode circuit 26 may be configured to forward the decoded data to the data sink 28 (block 98).

Figure 7:
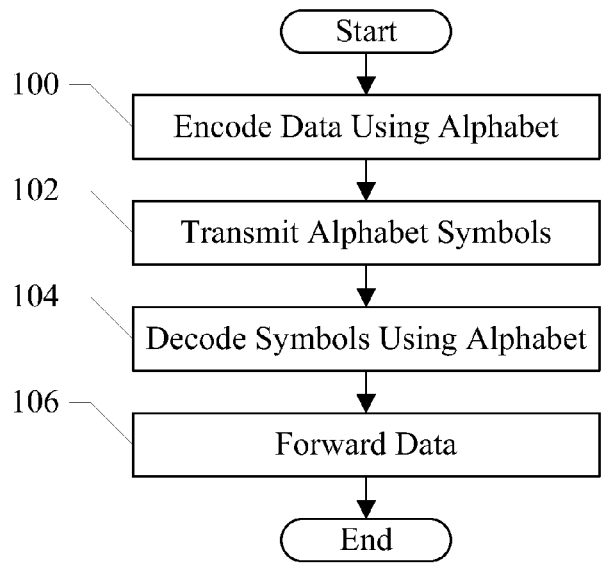
FIG. 7 is a flowchart illustrating operation of another embodiment of transmitting and receiving components.

FIG. 7 is a flowchart illustrating operation of another embodiment of the data encode circuit 18 and the data decode circuit 26. While the blocks are shown in a particular order in FIG. 7 for ease of understanding, other orders may be used. Blocks may be performed in parallel in combinatorial logic in the data encode circuit 18 and the data decode circuit 26. Blocks, combinations of blocks, and/or the flowchart as a whole may be pipelined over multiple clock cycles. The embodiment of FIG. 7 may be used when the data encoding is implemented as an alphabet of symbols that avoids the data patterns identified via the inverse Fourier transform.

The data encode circuit 18 may be configured to encode the data from the data source 16 using the alphabet, and may be configured to transmit the alphabet symbols representing the data (blocks 100 and 102). The data decode circuit 26 may receive the symbols and decode the symbols back to the original data (block 104) and forward the original data to the data sink 28 (block 106).

Figure 8:
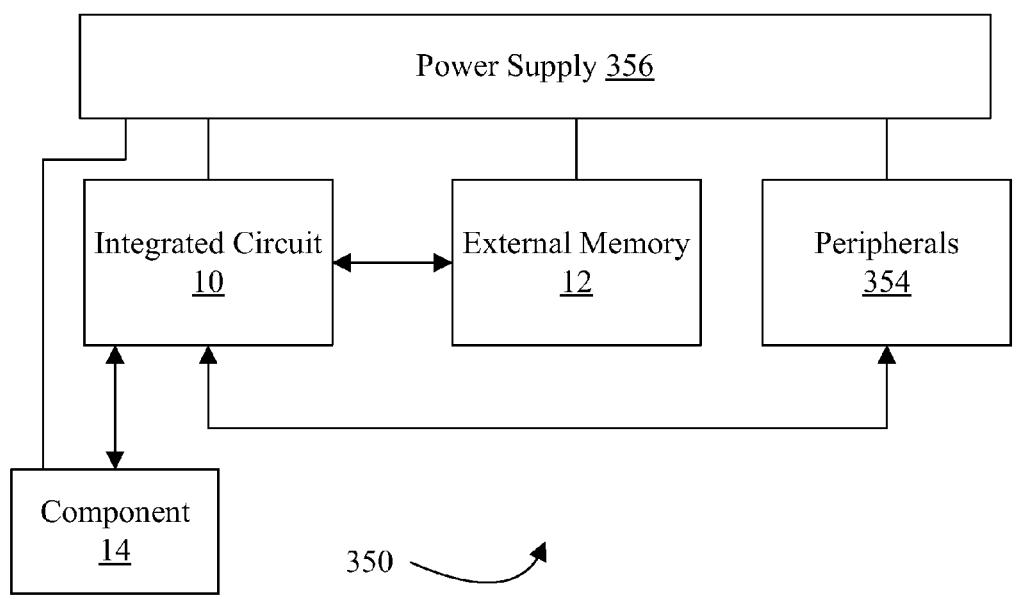
FIG. 8 is a block diagram of one embodiment of a system.

Turning next to FIG. 8, a block diagram of one embodiment of a system 350 is shown. In the illustrated embodiment, the system 350 includes at least one instance of the integrated circuit 10 coupled to an external memory 12 and the component 14. The integrated circuit 10 is coupled to one or more peripherals 354 and the external memory 12. A power supply 356 is also provided which supplies the supply voltages to the integrated circuit 10 as well as one or more supply voltages to the memory 12, the component 14, and/or the peripherals 354. In some embodiments, more than one instance of the integrated circuit 10 and/or the component 14 may be included (and more than one external memory 12 may be included as well). The external memory 12 may also be an example of a component, as may the power supply 356 and the peripherals 354.

The peripherals 354 may include any desired circuitry, depending on the type of system 350. For example, in one embodiment, the system 350 may be a mobile device (e.g. personal digital assistant (PDA), smart phone, etc.) and the peripherals 354 may include devices for various types of wireless communication, such as wifi, Bluetooth, cellular, global positioning system, etc. The peripherals 354 may also include additional storage, including RAM storage, solid state storage, or disk storage. The peripherals 354 may include user interface devices such as a display screen, including touch display screens or multitouch display screens, keyboard or other input devices, microphones, speakers, etc. In other embodiments, the system 350 may be any type of computing system (e.g. desktop personal computer, laptop, workstation, net top etc.).

Numerous variations and modifications will become apparent to those skilled in the art once the above disclosure is fully appreciated. It is intended that the following claims be interpreted to embrace all such variations and modifications.

What is claimed is:
1. An integrated circuit comprising:
a data source configured to generate data to be communicated external to the integrated circuit;
a data encode circuit coupled to the data source, wherein the data encode circuit is configured to encode the data to generate encoded transmission data, wherein the data encode circuit is configured to avoid one or more first data patterns in the encoded transmission data, wherein the one or more first data patterns correspond to one or more frequencies in the power spectral density corresponding to the encoded transmission data, wherein the one or more frequencies are used for wireless communication in a device that includes the integrated circuit, and wherein the data encode circuit is configured to replace each of the first data patterns with a respective second data pattern to prevent transmission of the first data patterns; and a driver circuit coupled to receive the encoded transmission data with the first data patterns replaced, wherein the driver circuit is configured to drive the encoded transmission data external to the integrated circuit, and wherein the data encode circuit is configured to include a first indication in the encoded transmission data to identify the corresponding second data pattern that replaces the first data pattern, and wherein the data encode circuit is further configured to compare initial encoded data to the one or more second data patterns, and wherein the data encode circuit is configured to include a second indication in the encoded transmission data responsive to detecting one of the second data patterns in the initial encoded data, the second indication in a different state than the first indication provided when the corresponding second data pattern is included in the encoded transmission data to replace the first data pattern.

2. The integrated circuit as recited in claim 1 further comprising a plurality of control registers coupled to the data encode circuit, wherein the plurality of control registers are programmable with the one or more first data patterns.

3. The integrated circuit as recited in claim 2 wherein the data encode circuit is configured to encode the data to produce the initial encoded data.

4. A system comprising:
a first component configured to transmit encoded data;
a second component coupled to the first component to receive the encoded data;
wherein the first component is configured to prevent transmission of one or more identified data patterns in the encoded data, wherein the identified data patterns, if transmitted, cause noise to occur at one or more frequencies that are used for wireless communication in the system, and wherein the first component is configured to prevent transmission of the identified data patterns by detecting the identified data patterns and replacing the identified data patterns with second data patterns, wherein the first component is configured to detect one of the second data patterns in the encoded data, and wherein the first component is configured to insert a flag identifying the second data pattern as part of the encoded data rather than a replacement for the identified data pattern, wherein the second component is configured to detect the flag and to decode the second data pattern instead of reverting to the identified data pattern.

5. The system as recited in claim 4 wherein the second data patterns do not cause noise at the one or more frequencies.

6. The system as recited in claim 4 wherein the first component is configured to insert a flag with the second data patterns to indicate the replacement.

7. The system as recited in claim 6 wherein the second component is configured to detect the flag and to reverse the replacement responsive to the flag.

8. The system as recited in claim 6 wherein the flag follows the corresponding second data pattern in the encoded data.

9. A method comprising:
receiving, in a data encoder circuit, data to be transmitted in a system;
encoding the data in the data encoder circuit;
comparing the encoded data to one or more data patterns that are not to be transmitted, the comparing performed in the data encoder circuit;
modifying the encoded data in the data encoder circuit responsive to detecting the one or more data patterns, wherein the modifying eliminates the one or more data patterns from the encoded data;
transmitting the modified encoded data;
appending a flag to the modified encoded data to indicate that the modified encoded data has been modified;
detecting the flag in a receiver of the data;
reversing the modifying prior to decoding the encoded data;
comparing the encoded data to one or more modified patterns that correspond to the one or more patterns; and
appending the encoded data with a second flag to indicate that the encoded data includes the modified pattern as original data responsive to detect the modified pattern in the comparing.

10. The method as recited in claim 9 further comprising:
detecting the second flag in a receiver of the data; and
decoding the encoded data as original data instead of the one or more data patterns that are not to be transmitted.

* * * * *